United States Patent [19]

Dickensheets et al.

[11] Patent Number: 5,742,419
[45] Date of Patent: Apr. 21, 1998

[54] MINIATURE SCANNING CONFOCAL MICROSCOPE

[75] Inventors: David L. Dickensheets; Gordon S. Kino, both of Stanford, Calif.

[73] Assignee: The Board of Trustees of the Leland Stanford Junior Universtiy, Stanford, Calif.

[21] Appl. No.: 575,687

[22] Filed: Dec. 19, 1995

Related U.S. Application Data

[60] Provisional application No. 60/006,303, Nov. 11, 1995.
[51] Int. Cl.$^6$ ............................ G02B 26/08; G02B 21/00
[52] U.S. Cl. .......................... 359/201; 359/202; 359/223; 359/224; 359/368
[58] Field of Search ................................. 359/201, 202, 359/223, 224, 368, 385; 385/33; 250/201.3

[56] References Cited

U.S. PATENT DOCUMENTS 4,956,619  9/1990  Hornbeck ........................... 330/4.3
5,061,049 10/1991  Hornbeck ........................... 359/224

OTHER PUBLICATIONS

L.Giniunas, R.Juskaitis & S.V.Shatalin, "Scanning Fiber Optic Microscope," Elect. Lett. 27, 724–726, Feb. 1991.
T.Dabbs & M.Glass, "Fiber–optic Confocal Microscope: FOCON," Applied Optics, vol. 31, #16, Jun. 1992, pp. 3030–3035.
L.Giniunas, R.Juskaitis & S.V.Shatalin, "Endoscope with optical sectioning capability," Jun. 1993, Applied Optics, vol. 32, #16, pp. 2888–2890.
R.Juskaitis & T. Wilson, "Direct–view fiber–optic confocal microscope," Opt. Lett. vol. 19, 190 22, Nov. 1994, pp. 1906–1908.

P.M. Delaney, M.R. Harris & R.G. King, "Fiber–optic laser scanning confocal microscope suitable for fluorescence imaging," Applied Optics, vol. 33, #4, Feb. 1994, pp. 573–577.
A.F. Gmitro & D. Azis, "Confocal microscope via a fiber–optic imaging bundle," SPIE, vol. 1893 Optical Fibers in Medicine VIII (1993)m pp. 53–61.
D. Dickensheets & G.S. Kino, "A Scanned Optical Fiber Confocal Microscope," Proc. SPIE, 2184, 39–47 (1994).
Kurt E. Petersen, "Silicon Torsional Scanning Mirror," IBM J.Res.Dev. vol. 24, #5, Sep. 1990, pp. 631–637.
M.G. Allen, M. Scheidel & R.L. Smith, "Movable Micromachined Silicon Plates with Integrated Position Sensing," Sensors and Actuators A21–A23, 211–214 (1990).
V.P. Jaecklin, C. Linder, N.F. deRooji, J.M. Moret, R. Vuilleumier, "Line–addressabale torsional micromirrors for light modulator arrays," Sensors and Actuators A, 41–42 (1994), pp. 324–329.
M. Fischer, H. Graef, W. von Munch, "Electrostatically deflectable polysilicon torsional mirrors, " Sensors and Actuators A 44 (1994), pp. 83–89.
K.E. Mattsson, "Surface micromachined scanning mirrors," Microelectronic Engineering 19, (1992), pp. 199–204.

Primary Examiner—James Phan
Attorney, Agent, or Firm—Flehr Hohbach Test Albritton & Herbert LLP

[57] ABSTRACT

A scanning optical microscope which includes an optical fiber which serves as a point source of light and for collecting reflected light is disclosed. A lens for focusing the light from the optical fiber onto an image plane and for gathering light reflected from the image plane and focusing it into the optical fiber is also disclosed, together with a scanning mechanism for scanning the light to scan a field of view.

12 Claims, 8 Drawing Sheets

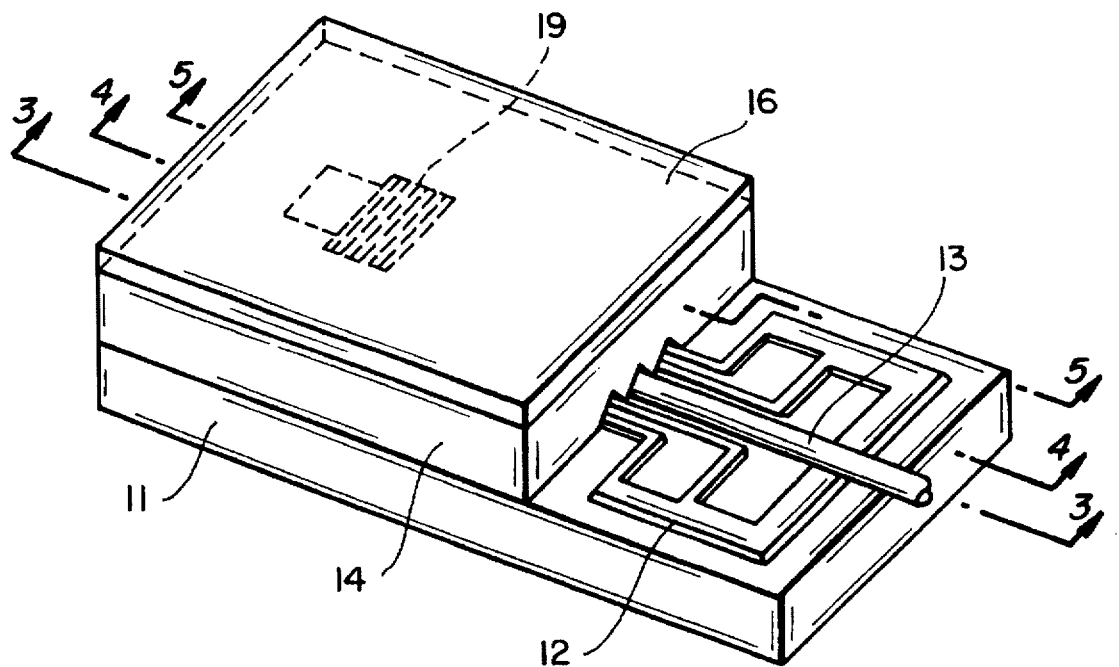
FIG_1
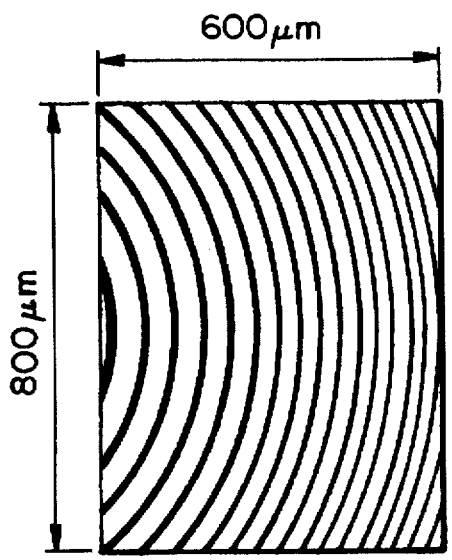
FIG_6
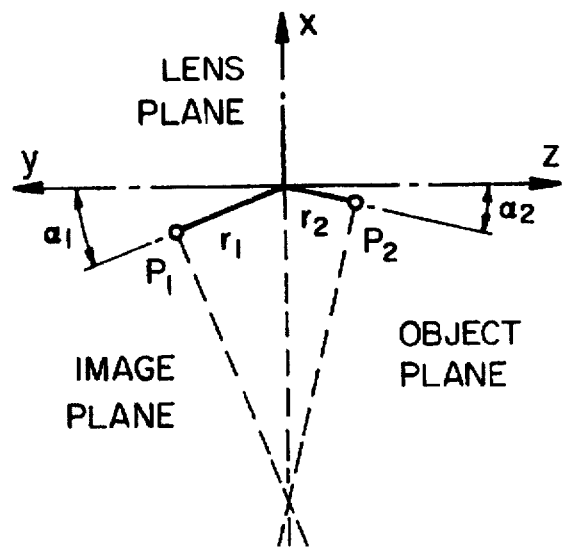
FIG_7

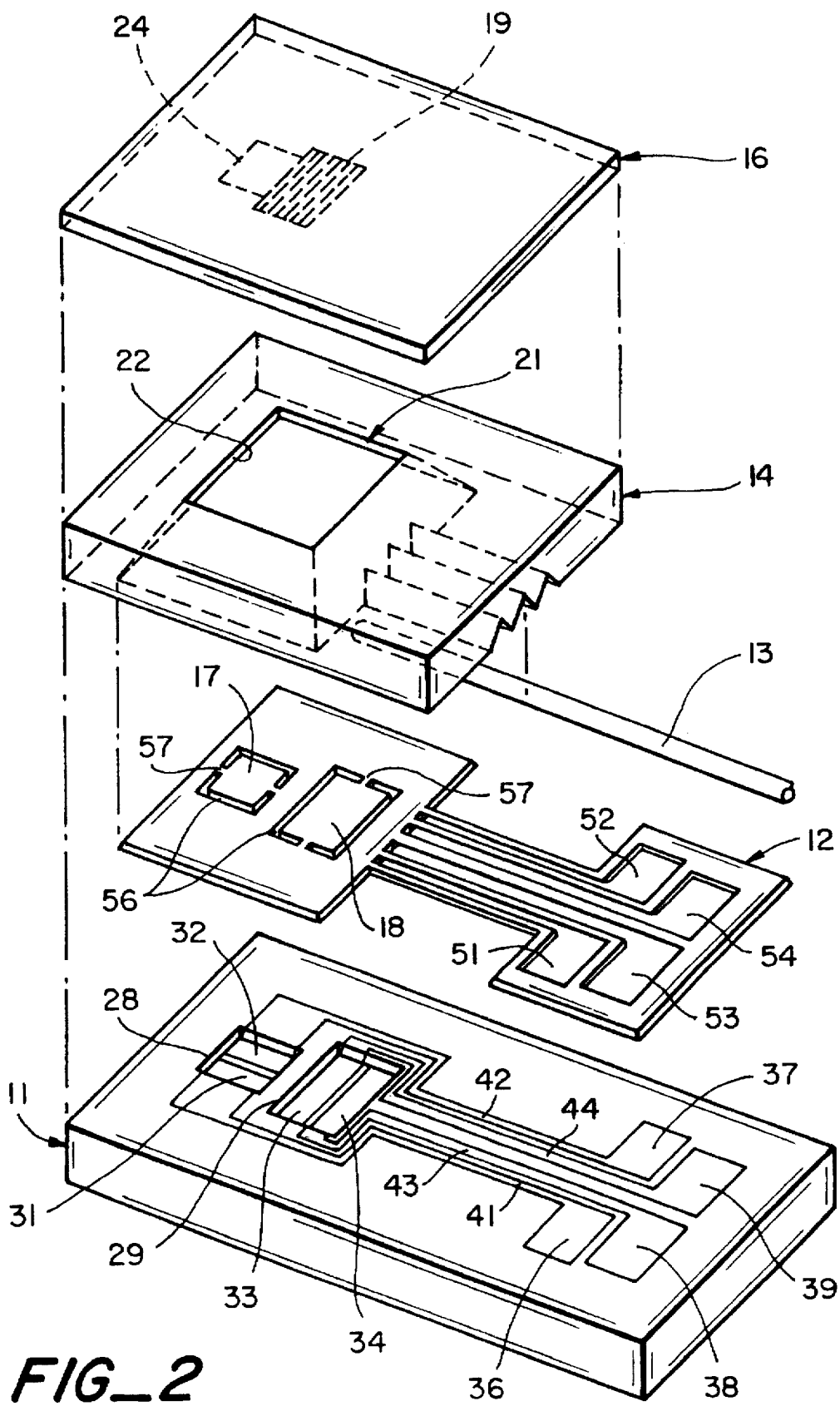
FIG_2

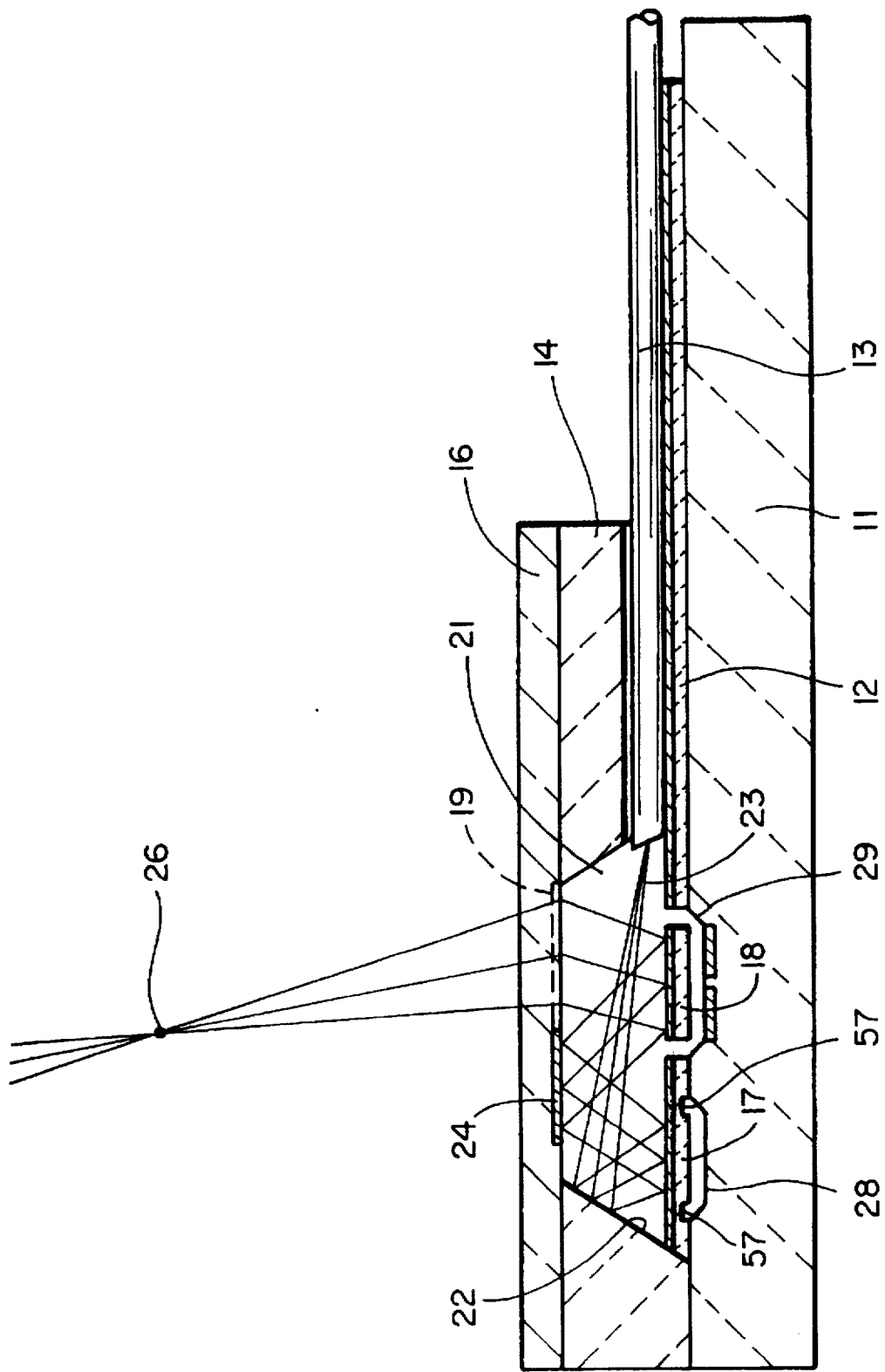
FIG_3

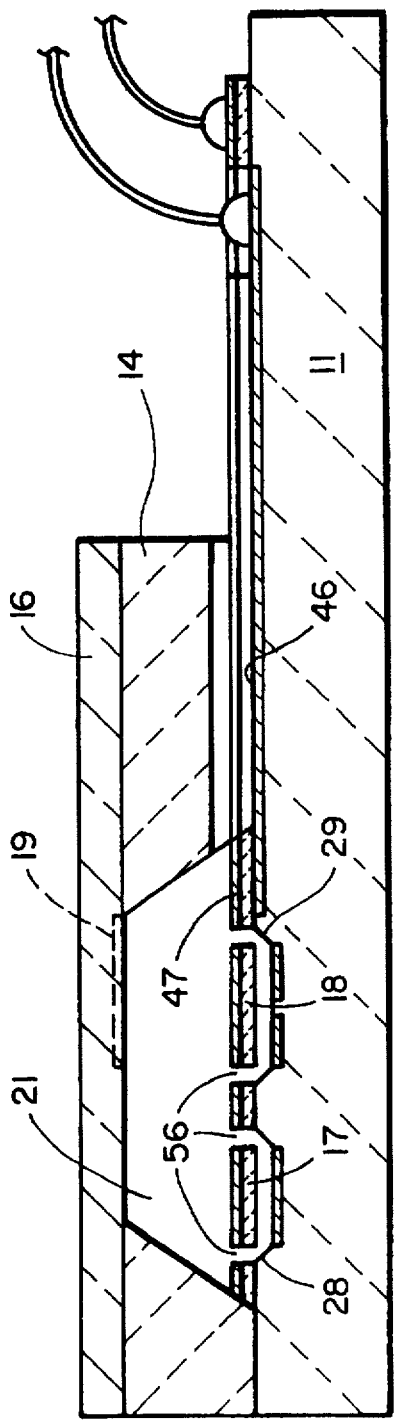
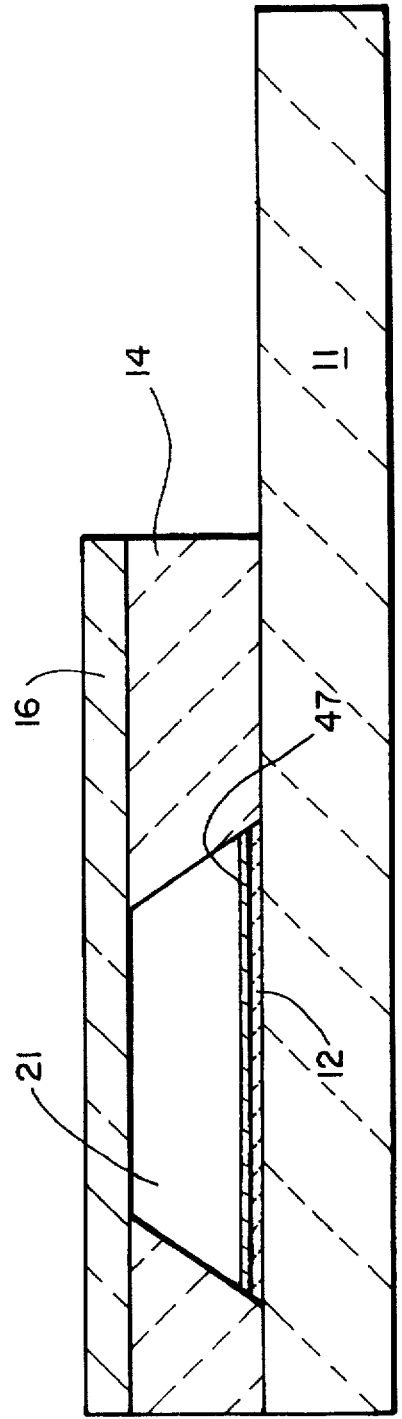
FIG_4
FIG_5

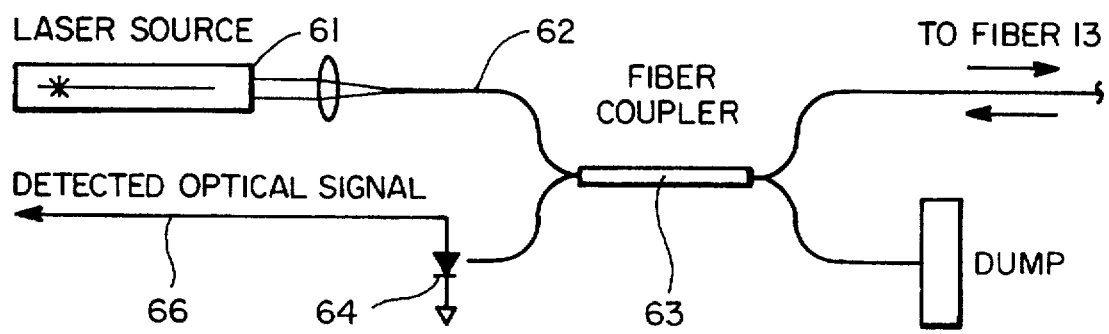
FIG_8
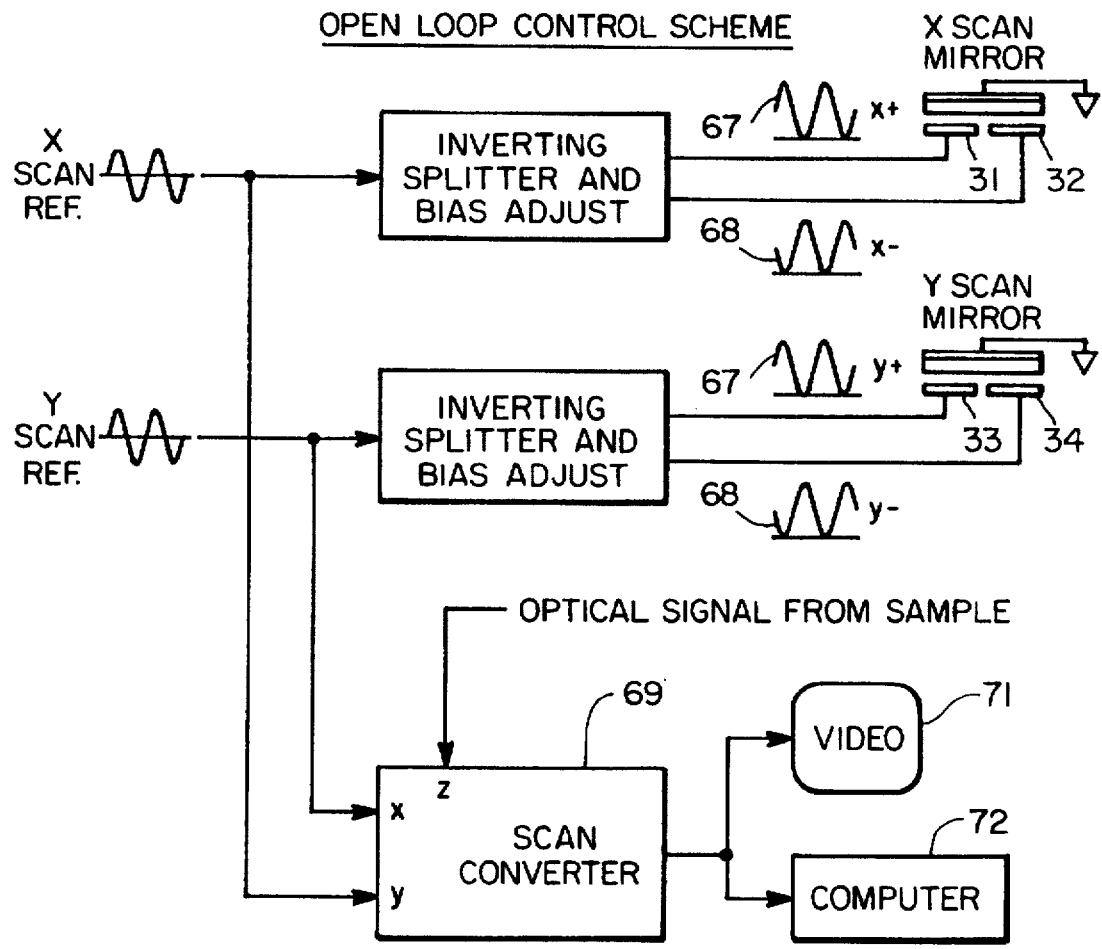
FIG_9

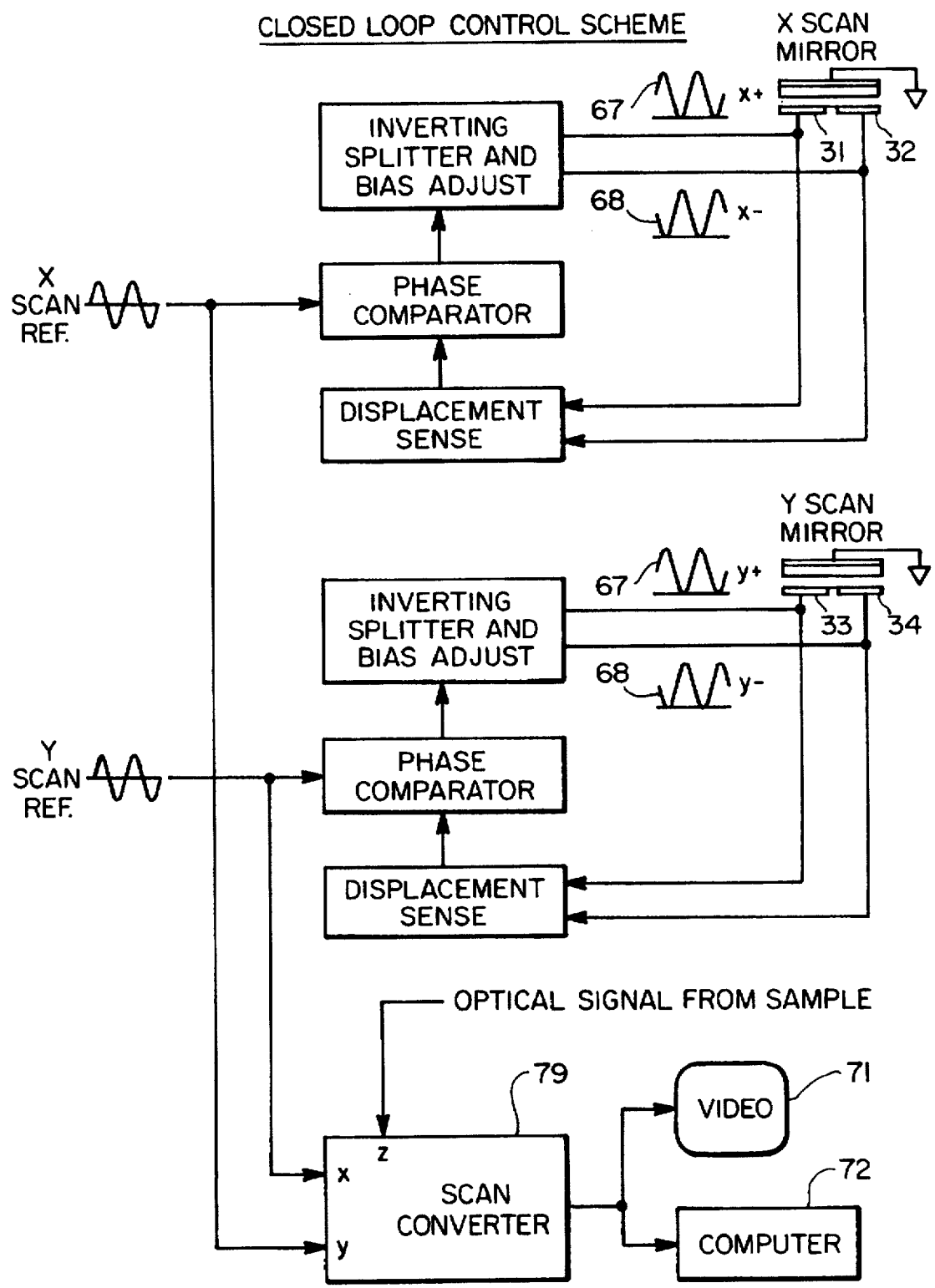
FIG_10

FIG_11
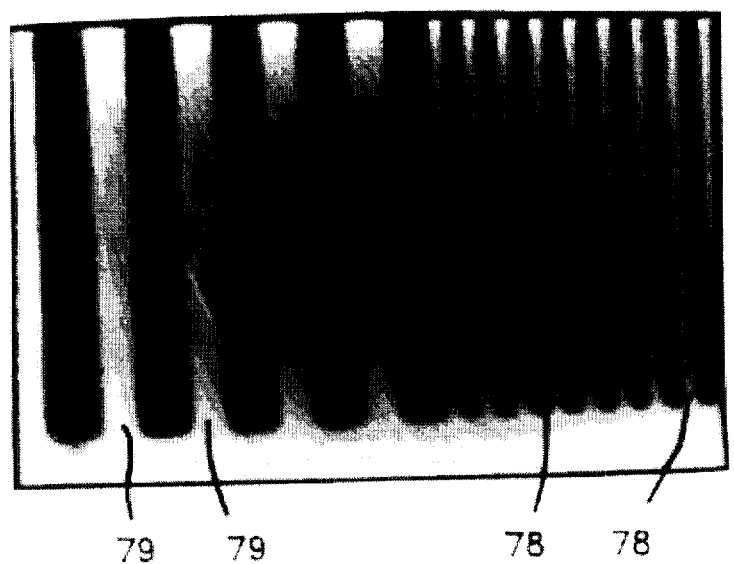
FIG_12

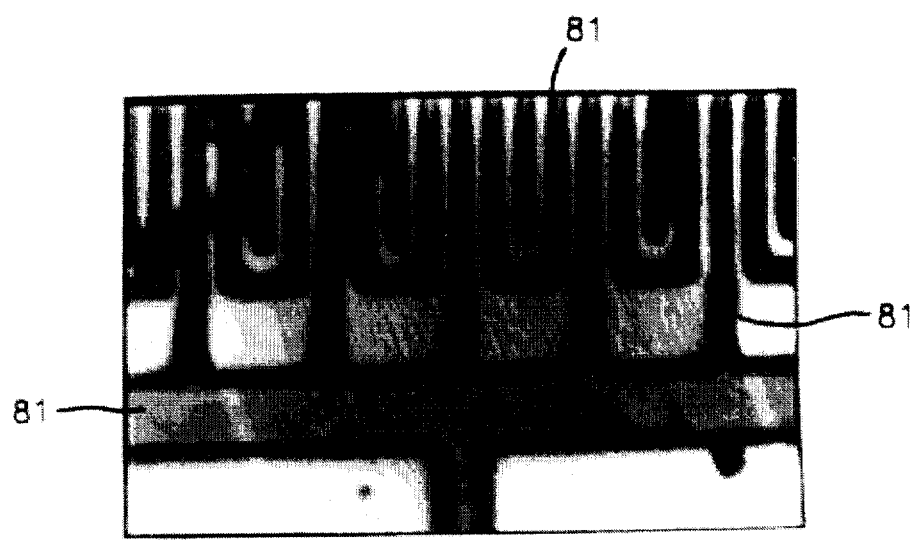
FIG_13
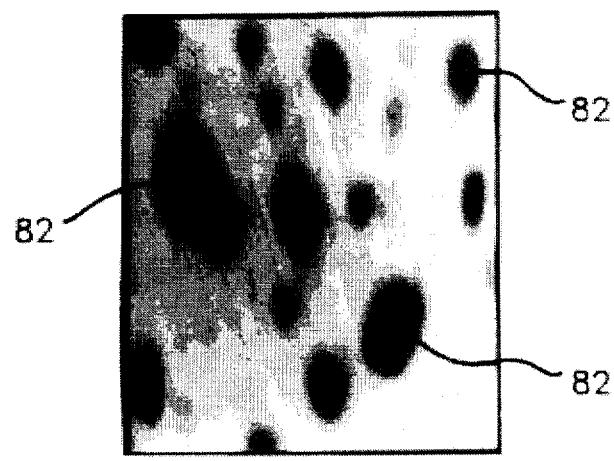
FIG_14

MINIATURE SCANNING CONFOCAL MICROSCOPE

REFERENCE TO RELATED APPLICATIONS

This application claims the priority of Provisional Application Serial No. 60/006303 filed Nov. 11, 1995.

BRIEF DESCRIPTION OF THE INVENTION

This invention relates generally to miniature confocal microscopes and more particularly to scanning confocal microscopes using micro-machined mirrors.

BACKGROUND OF THE INVENTION

The standard optical microscope, used routinely in biology, medicine and semiconductor processing, is large. Typically, samples of tissue are observed in vitro after being mounted on a microscope slide. Such microscopes are not suitable for in vivo observations of the skin or internal organs of the human body; they are just too large. Consequently, there is a need for a small microscope which could be used for observations of melanomas of the skin, and the teeth and gums, and for endoscopy of cells inside arteries and veins and organs of the body. Ultimately, if such a microscope could be mounted inside a hypodermic needle, it would be suitable for taking in vivo biopsies and for observing microscopic features of the body, such as the flow of blood and plasma in veins, arteries, and other vessels of the body, the fluid in tear ducts, and the general condition of small vessels. Although we have described biological applications of a miniature microscope, the miniature microscope of the present invention can be used in endoscopes passed through small pipes, and for use in in-situ observation during processing of semiconductors and other materials.

The present tendency is to carry out clinical procedures with small tools mounted in catheters, to make internal observations inside vessels with fiber optic devices, and to carry out operations using laser and fiber-optic techniques. Much less damage is done to the body than with older surgical methods by using such procedures. Observations of what is being done on a microscopic scale would be helpful, since the best resolution that presently can be obtained with endoscopes is of the order of 10–20 μm. Another example is the observation of cancer cells in the uterus, where it is extremely painful to carry out biopsies. An in vivo imaging technique for this purpose which leaves the tissue intact would be a considerable improvement over present practice.

Several fiber optic microscopes have been suggested in the past, but either they are too bulky or too slow, so that the frame time is of the order of several seconds, or the definition is very poor[1-6]. Thus, these microscopes are not suitable for in vivo real-time imaging at the microscopic level.

We reported a vibrating fiber microscope in a recent paper[7]. A Fresnel lens made by photolithographic means was mounted on the end of a vibrating glass rod approximately 0.8 mm square. The lens was illuminated from an optical fiber glued to the other end of the rod, and formed a spot of the order of 1.8 μm in diameter at an approximate distance of 1 mm from the lens. Light reflected from the object being observed was passed back through the fiber and lens to a detector. The signal from the detector, after suitable processing, was displayed through an image converter as a video image. The rectangular-shaped rod was vibrated by electrostatic fields, applied between it and an outer tube, at its slightly different mechanical resonant frequencies in the x and y directions. Hence, the focused spot from the lens formed a raster pattern (a Lissajous figure). The vibration frequencies were of the order of 8 kHz, and a single frame of the image took about 1/20 second to form. The resolution was about 2 μm. This microscope suffered from the disadvantage that the vibrating rod needed support from a rigid and massive structure, which made the supporting structure large and unsuitable for use in the body.

OBJECTS AND SUMMARY OF THE INVENTION

It is an object of this invention to provide a micro-machined miniature scanning optical microscope.

It is another object of the invention to provide a miniature scanning optical microscope using micro-machined, electrostatically actuated scanning mirrors.

It is still another object of the invention to provide a miniature scanning optical microscope using micro-machined, electrostatically actuated scanning mirrors and a micro-machined binary lens.

There is provided a scanning optical microscope which incorporates electrostatically actuated scanning mirrors disposed between a single-mode optical fiber light source/detector and a focusing objective lens.

BRIEF DESCRIPTION OF THE DRAWINGS

The foregoing and other objects of the invention will be more fully understood from the following description read in connection with the accompanying drawings, of which:

FIG. 1 is a perspective view of a miniature confocal scanning microscope in accordance with the invention;

FIG. 2 is an exploded view showing the parts of the microscope of FIG. 1;

FIG. 3 is a sectional view taken along the line 3—3 of FIG. 1;

FIG. 4 is a sectional view taken along the line 4—4 of FIG. 1;

FIG. 5 is a sectional view taken along the line 5—5 of FIG. 1;

FIG. 6 shows the zone plate line schematically illustrated in FIGS. 1 and 2;

FIG. 7 shows the angles employed in the design of an off-axis zone plate lens;

FIG. 8 shows the optical fiber illumination/detection configuration;

FIG. 9 shows an open-loop electronic drive circuit associated with the scanning mirrors and the signal processing circuit FIG. 10 shows a closed-loop electronic drive circuit associated with the scanning mirrors and the signal processing circuit;

FIG. 11 shows an image of chrome lines on a glass substrate taken with a microscope in accordance with the invention;

FIG. 12 shows another image of chrome lines on a glass substrate taken with a microscope in accordance with the invention;

FIG. 13 shows an image of a silicon test structure taken with a microscope in accordance with the invention; and FIG. 14 shows an image of red blood cells taken with a microscope in accordance with the invention.

DESCRIPTION OF THE PREFERRED EMBODIMENT

A miniature scanning confocal microscope in accordance with the invention is illustrated in the perspective view of FIG. 1, the exploded view of FIG. 2 and the sectional views of FIGS. 3–5. The microscope includes a silicon substrate 11, a bonded silicon plate 12, a single mode optical fiber 13, a silicon spacer 14 and a fused silica lens plate 16 bonded to the silicon spacer 14. The plate 12 includes a pair of micro-machined scanning mirrors 17, 18 disposed between the single mode optical fiber 13 and a miniature objective lens 19 formed in the silica lens plate 16. The silicon spacer comprises <100> silicon which is etched to form an opening 21 which forms a <111> face 22. Referring to FIG. 3, the light beam 23 from the fiber 13 is first reflected from the etched <111> face 22 onto the first scanning mirror 17, then from a metallized mirror 24 on the lens plate 16 back to the second scanning mirror 18. The light beam is then reflected from the second scanning mirror 18 and passes through an off-axis zone plate objective lens 19 etched into the fused silica lens plate 16. The lens images the output from the fiber to a point 26 on the sample plane. As the mirrors rotate, this point is scanned through the field of view. Light reflected back from the sample is re-imaged by the lens 19, back along the same path to the fiber, and is detected and processed to create an image. Since the fiber behaves like a small pinhole, the device is a confocal microscope with the range and transverse resolution to be expected from a confocal scanning-optical microscope.

The mirror scanners are fabricated using silicon micro-machining techniques. Micro-machined torsional mirrors for use in scanners and spatial light modulators have been reported by numerous authors.[8-14] The rotational axes of the two mirrors are orthogonal, so that one mirror scans the light beam in the x-dimension and the other mirror scans it in the y-dimension. As will be presently described, the mirrors 17, 18 are electrostatically rotated.

The silicon substrate 11 is masked and etched to form spaced wells 28, 29 below the mirrors 17, 18 whereby the mirrors can rotate. The substrate is masked and impurities are implanted into the substrate to form conductive regions. More particularly, two conductive regions 31, 32 are formed at the bottom of well 28 and two conductive regions 33, 34 are formed at the bottom of the well 29. These regions are connected to ion-implanted contact regions 36, 37 and 38, 39 by ion-implanted leads 41, 42 and 43, 44. A bonding thermal oxide layer 46 is formed on the surface. A silicon nitride cap is formed over the oxide in the wells 28, 29 to provide insulation during a subsequent metallization step.

The silicon plate 12 is bonded to the substrate via an oxide layer on the plate and the substrate oxide 46. A silicon nitride layer 47 is formed on the plate 12 and by suitable masking and etching, windows 51, 52 and 53, 54 are formed to expose the contact regions 36, 37 and 38, 39. The mirrors 17, 18 are defined by etching the slots 56 leaving silicon nitride strips 57, which serve as hinges. The etching removes the silicon from beneath the hinges while leaving the silicon under the mirror surfaces to provide a rigid mirror. After the mirrors have been defined, a conductive layer is deposited on the top of the silicon plate to provide, on the surface of the mirrors, a reflective surface and one plate of a capacitor which cooperates with the conductive regions 31, 32 and 33, 34 to provide electrostatic forces which cause the mirrors to rotate at the hinges. Actuation of the mirrors is accomplished by applying voltages between the conductive film on the surface of the mirror and the individual implanted regions 31, 32 and 33, 34. The conductive film also covers the implanted contact regions 36, 37 and 38, 39. The film at the upper surface of the plate is not in contact with the film at the contact areas.

The off-axis zone plate lens, FIG. 6, is fabricated using electron beam lithographic pattern transfer and anisotropic reactive ion etching. The angles at which the light beam enters and exits the lens are specifically designed so that the beam emitted from the lens is well focused throughout the field of view, with no second order aberrations. The local structure of the lens grating has itself been optimized to increase the efficiency of the lens relative to a similar lens designed for on-axis imaging.

The quality of the image formed by the microscope is governed by the design of the lens. Traditional microscope objectives have many glass elements all of which are combined to reduce the aberration of the image to a minimum. For this invention, one benefits from the use of a very simple, single element objective. Because a laser source illumination at a single wavelength of light is used, one can use a diffractive lens rather than the more usual refractive type. This is a distinct advantage from a manufacturing point of view since a diffractive lens can be made lithographically with tight control over the pertinent design parameters. One gives up, however, the expectation of performing aberration-free imaging when one chooses to implement the microscope with a single diffractive lens element.

The aberrations of axially symmetric grating lenses are well known. For this application, one desires high resolution and, therefore, high numerical aperture in the objective lens. The primary aberration (so-called third order aberration) that limits numerical aperture in an axially symmetric grating lens with the stop at the lens is coma.

With the zigzag optical path used for the microscope, one requires a lens that is not axially symmetric, but is designed to create an image from a beam of light that is incident at an angle from the lens normal. In general, such an off-axis lens will suffer from a more serious second order aberration called linear astigmatism. It has been discovered, however, that if the angles of incidence of the object beam and the image beam are chosen properly then the second order astigmatism disappears and imaging is again governed by third order coma. The constraint on the angles is that $$\sin(\alpha_1)/r_1 = \sin(\alpha_2)/r_2$$

where the angles $\alpha_1$, $\alpha_2$, $r_1$ and $r_2$ are defined in FIG. 7.

The phase function of this lens is such that the points in the center of the field of view, $P_1$ and $P_2$ are perfect images of one another.

When the microscope is constructed with regard to this constraint on the angles made by the incoming and exiting beams with the normal to the lens plane, then the imaging aberrations of the off-axis lens are quite similar to the aberrations of the more familiar, axially symmetric lens. Any significant deviation from this relationship would result in an instrument with extremely poor performance, and therefore the geometric relationship described above is paramount to the operation of the microscope. On the other hand, the fact that there exists a situation favorable to off-axis imaging enables one to implement the microscope With a zigzag optical path, keeping the overall dimensions very small and the design simple.

Note finally from the figure that the object and image planes are normal to the direction the beam of light is travelling. This is important for a reflection microscope, since the lens must collect the light reflected from the sample. If the sample plane was tilted with respect to the incoming beam, then the reflected light would not retrace its path back into the lens.

The single mode optical fiber illumination/detection system is shown in FIG. 8. A light source 61, such as a 3 mw helium-neon laser at 632.8 nm supplies light to one end of a single-mode optical fiber 62 which is used as a flexible conduit to deliver light to the fiber 13 which serves as the point source and detector for confocal operation of the microscope. The single lens focuses the light from the fiber onto the sample and collects the back-scattered light. A directional coupler 63 directs the reflected light from the sample onto photodetector 64 to provide an output signal 66.

The scanning microscope electronic interface is simple in principle. Referring to FIGS. 9 and 10, each scanning mirror is driven by two symmetrically placed electrodes 31, 32 and 33, 34, one on either side of the rotational axis. Application of a voltage between the electrode and the mirror plate results in an attractive electrostatic force proportional to the square of the magnitude of the voltage. To tilt the mirror one way or the other, a voltage is applied to one electrode at a time causing the mirror to deflect toward that electrode. For oscillatory motion, a sinusoidal drive voltage 67 is applied to the electrode, with a DC bias sufficient to keep the voltage always positive. The opposing electrode receives a voltage 68 with the opposite phase, so that as one side sees the maximum voltage the other side sees zero voltage resulting in a net torsional force at the mirror. The frequency of the drive signal may be adjusted to cause the mirror to oscillate at its natural resonance or off resonance. Near resonance, the motion of the mirror will be phase shifted relative to the drive voltage waveform. In order to form an image from the detected light reflected from the sample, it is necessary to know the precise position of the mirror. A scan converter 69 is used for this purpose, which takes as its input the drive signals and the detected optical signal from the fiber, and produces as its output a raster scanned image suitable to display on a monitor 71 or for capture on a computer 72.

There are two possible control schemes. The simplest is open loop control, FIG. 9, where it is assumed that the kinetic response to the mirrors is known well enough that one only need to monitor the drive voltage in order to predict the mirror position. Then the scan converter maps the intensity of the detected optical signal to the calculated position of the beam. The other scheme is closed loop control, FIG. 10, where the position of the mirrors is independently monitored and this information is used in a feedback scheme that attempts to lock the motion of the mirrors to the drive voltage waveform. One of the simplest ways to monitor the position of the mirror is to measure the capacitance between the mirror plate and the drive electrodes. This capacitance will vary with the angular position of the mirror, so that monitoring the capacitance fluctuation provides a direct measure of the mirror position. With closed loop control, the control loop is capable of making the mirror motion exactly follow the drive voltage, so that the scan converter may use the x and y drive signals directly to map the intensity to the proper position of the beam, without any specific knowledge of the mirror kinetics.

A microscope was constructed which was 6 mm long, 2.5 mm wide and 1 mm high. The scanning mirror 17 was 300 µm by 360 µm and the scanning mirror 18 was 500 µm by 600 µm. The single mode optical fiber 13 was 125 µm in diameter.

The microscope was operated to provide both raster-scan and lissajous-scan images. In the first example, the microscope was used to scan a glass substrate provided with chrome lines 2 µm wide on 4 µm centers and a 5 µm line. The mirror 17 was scanned at a frequency of 2.71 kHz with approximately 20V peak-to-peak sinusoidal voltage. The mirror 18 was driven at a frequency of 5 Hz with approximately 25 peak-to-peak sinusoidal voltage. The field of view was 30×24 µm. The resulting raster-scan image is shown in FIG. 11, which has 271 lines/frame at a frame rate of 5 Hz. The 2 µm lines are shown at 76 and the 5 µm line is shown at 77.

In the second example, the microscope was used to scan a glass substrate with chrome lines 2 µm wide on 4 µm centers and 5 µm lines on 10 µm centers. The mirror 17 was scanned at a frequency of 4.3 kHz with approximately 30V peak-to-peak sinusoidal voltage. The mirror 18 was driven at a frequency of 1.07 kHz with approximately 25V peak-to-peak sinusoidal voltage. The field of view was about 80 µm×60 µm. The resulting lissajous-scan image is shown in FIG. 12. The frame rate was 8 Hz with 268 lines/frame. The 2 µm and 5 µm lines are shown at 78 and 79.

In another example, the microscope was used to scan an etched silicon test structure having U-shaped trenches. The mirror 17 was scanned at a frequency of 4.3 kHz with 30V peak-to-peak sinusoidal voltage, giving a field of view of 80 µm×60 µm. The resulting Lissajous-scan image is shown in FIG. 13. The trenches are shown at 81. The frame rate was 8 Hz with 268 lines/frame.

In a fourth example, the microscope was used to scan red blood cells on a glass slide. The mirror 17 was scanned at a frequency of 4.3 kHz with a 30V peak-to-peak sinusoidal drive voltage. The mirror 18 was driven at a frequency of 1.07 kHz with a 15V peak-to-peak drive voltage. The field of view was 40 µm×60 µm. The resulting Lissajous-scan image is shown in FIG. 14. The red cells are shown at 82. The frame rate was 8 Hz with 268 lines/frame.

Although a specific embodiment of the invention has been provided, modifications can be made without departing from the invention. For example, the mirrors may be cantilevered or supported on a single post. The off-axis grating lens could be a reflecting type lens. The micro-machined microscope can be further miniaturized to provide a scanning microscope which can be mounted inside a hypodermic needle. Thus, there has been provided a miniature scanning confocal microscope making use of micro-machined scanning mirrors and parts.

1. L. Giniunas, R. Juskaitis & S. J. Shatalin, "Scanning fiber optic microscope," *Elect. Lett.* 27, 724–726 (1991).
2. T. Dabbs & M. Glass, "Fiber-optic confocal microscope—FOCON," *Appl. Opt* 31, 3030–3035 (1993).
3. L. Giniunas, R. Juskaitis & S. J. Shatalin, "Endoscope with optical sectioning capability," *Appl. Opt.* 32, 2888–2890 (1993).
4. R. Juskaitis & T. Wilson, "Direct-view fiber-optic confocal microscope," *Opt. Lett.* 19, 1906–1908 (1994).
5. P. M. Delaney, M. R. Harris & R. G. King, "Fiber optic laser scanning confocal microscope suitable for fluorescence imaging," *Appl. Opt.* 33, 573–577 (1994).
6. A. F. Gmitro & D. Azis, "Confocal microscope through a fiber-optic imaging bundle," *Opt. Lett.* 18, 565–567 (1993).
7. D. Dickensheets & G. S. Kino "A Scanned Optical Fiber Confocal Microscope," *Proc. SPIE*, 2184, 39–47 (1994).
8. K. E. Petersen, "Silicon Torsional Scanning Mirror," *IBM J. Res. Dev.*, 24, 631–637 (1980).
9. M. G. Allen, M. Scheidel & R. L. Smith, "Movable Micromachined Silicon Plates with Integrated Position Sensing," *Sensors and Actuators*, A21–A23, 211–214 (1990).
10. V. P. Jaecklin, C. Linder, N. F. deRooij, J. M. Moret, R. Vuilleumier, "Line-addressable torsional micromirrors for light modulator arrays," *Sensors and Actuators*, A41–42, 324–329 (1990).
11. M. Fischer, H. Graef, W. von Munch, "Electrostatically deflectable polysilicon torsional mirrors," *Sensors and Actuators*, A44, 83–89 (1994).

12. K. E. Mattsson, "Surface micromachined scanning mirrors," *Microelectronic Engineering* 19, 199–204 (1992).
13. L. J. Hornbeck, "Spatial light modulator and method," U.S. Pat. No. 5,061,049, Oct. 29, 1991.
14. L. J. Hornbeck, "Spatial light modulator," U.S. Pat. No. 4,956,619, Sep. 11, 1990.

What is claimed:

1. A scanning optical microscope of the type which includes a single mode optical fiber having one end which serves as a point source of light, and a lens for focusing the light from the end of the fiber onto a point on a focal plane, and for gathering light reflected from said point and focusing said light onto the end of the optical fiber, characterized in that it includes:

a first micro-machined scanning mirror to receive the light from the fiber and scans the light along a first direction, and a second micro-machined scanning mirror coplanar with said first micro-machined scanning mirror to receive the light from the first mirror and scans said light in an orthogonal direction, whereby the point on the focal plane is scanned in said first and second directions.

2. A scanning optical microscope as in claim 1 which includes an inclined reflector for receiving light from the optical fiber and directing it onto the first micro-machined scanning mirror, and a reflector disposed to receive light from said first micro-machined scanning mirror and reflect it onto the second micro-machined scanning mirror, which directs it to the focusing lens.

3. A scanning optical microscope including:

a silicon substrate including first and second wells;

a first pair of ion-implanted conductive regions in said first well;

a second pair of ion-implanted conductive regions in said second well;

a first micro-machined scanning mirror hingedly supported above said first well for rotation about a first axis;

a second micro-machined scanning mirror hingedly supported above said second well for rotation about a second orthogonal axis;

a conductive reflective film carried on the surface of said first and second scanning mirrors which, together with the conductive regions in said wells, form spaced plates which are electrostatically driven with respect to one another to thereby rotate said mirrors;

an optical fiber serving as a point source of light, said first scanning mirror scanning the light from the optical fiber in a first direction and said second mirror scanning the light in an orthogonal direction; and a lens for receiving the light scanned by said mirrors and focusing it at scanned points on an image plane and for receiving light reflected from said plane and directing it back to the optical fiber.

4. A scanning optical microscope as in claim 3 which includes an inclined reflector for receiving light from the optical fiber and directing it into the first mirror and a reflector disposed to receive light from the first mirror and reflect it onto the second mirror which directs it to the focusing lens.

5. A scanning optical microscope as in claim 3 wherein the mirrors are coplanar.

6. A scanning optical microscope including:

a silicon substrate including first and second wells;

a first pair of ion-implanted conductive regions in said first well;

a second pair of ion-implanted conductive regions in said second well;

a first micro-machined scanning mirror hingedly supported above said first well for rotation about a first axis;

a second micro-machined scanning mirror hingedly supported above said second well for rotation about a second orthogonal axis;

a conductive reflective film carried on the surface of said first and second scanning mirrors which, together with the conductive regions in said wells, form spaced plates which are electrostatically driven with respect to one another to thereby rotate said mirrors;

an optical fiber serving as a point source of light, said first scanning mirror scanning the light from the optical fiber in a first direction and said second mirror scanning the light in an orthogonal direction; and an off-axis binary lens for receiving the light scanned by said mirrors and focusing it at scanned points on an image plane and for receiving light reflected from said plane and directing it back to the optical fiber.

7. A scanning optical microscope of the type which includes a single mode optical fiber having one end which serves as a point source of light, and a lens for focusing the light from the end of the fiber onto a point on a focal plane, and for gathering light reflected from said point and focusing said light onto the end of the optical fiber, characterized in that it includes:

a first micro-machined scanning mirror supported for rotation by spaced silicon-nitride hinges for receiving light from the fiber and scanning the light along a first direction, and a second micro-machined scanning mirror coplanar with said first micro-machined scanning mirror supported for rotation by spaced silicon-nitride hinges for receiving light from the first mirror and scanning said light in an orthogonal direction, whereby the point on the focal plane is scanned in said first and second directions.

8. A scanning optical microscope as in claim 7 which includes an inclined reflector for receiving light from the optical fiber and directing it onto the first mirror, and a reflector disposed to receive light from said first mirror and reflect it onto the second mirror, which directs it to the focusing lens.

9. A scanning optical microscope of the type which includes a single mode optical fiber having one end which serves as a point source of light, and an off-axis binary lens for focusing the light from the end of the fiber onto a point on a focal plane, and for gathering light reflected from said point and focusing said light onto the end of the optical fiber, characterized in that it includes:

a first micro-machined scanning mirror supported for rotation by spaced silicon-nitride hinges for receiving light from the fiber and scanning the light along a first direction, and a second micro-machined scanning mirror supported for rotation by spaced silicon-nitride hinges for receiving light from the first mirror and scanning said light in an orthogonal direction, whereby the point on the focal plane is scanned in said first and second directions.

10. A scanning optical microscope including:

a silicon substrate including first and second wells;

a first pair of ion-implanted conductive regions in said first well;

a second pair of ion-implanted conductive regions in said second well;

a first micro-machined scanning mirror hingedly supported above said first well by spaced silicon-nitride hinges for rotation about a first axis;

a second micro-machined scanning mirror coplanar with said first micro-machined scanning mirror hingedly supported above said second well by spaced silicon-nitride hinges for rotation about a second orthogonal axis;

a conductive reflective film carried on the surface of said first and second scanning mirrors which, together with the conductive regions in said wells, form spaced plates which are electrostatically driven with respect to one another to thereby rotate said mirrors;

an optical fiber serving as a point source of light, said first scanning mirror scanning the light from the optical fiber in a first direction and said second mirror scanning the light in an orthogonal direction; and a focusing lens for receiving the light scanned by said mirrors and focusing it at scanned points on an image plane and for receiving light reflected from said plane and directing it back to the optical fiber.

11. A scanning optical microscope as in claim 10 which includes an inclined reflector for receiving light from the optical fiber and directing it into the first mirror and a reflector disposed to receive light from the first mirror and reflect it onto the second mirror which directs it to said focusing lens.

12. A scanning optical microscope including:

a silicon substrate including first and second wells;

a first pair of ion-implanted conductive regions in said first well;

a second pair of ion-implanted conductive regions in said second well;

a first micro-machined scanning mirror hingedly supported above said first well by spaced silicon-nitride hinges for rotation about a first axis;

a second micro-machined scanning mirror hingedly supported above said second well by spaced silicon-nitride hinges for rotation about a second orthogonal axis;

a conductive reflective film carried on the surface of said first and second scanning mirrors which, together with the conductive regions in said wells, form spaced plates which are electrostatically driven with respect to one another to thereby rotate said mirrors;

an optical fiber serving as a point source of light, said first scanning mirror scanning the light from the optical fiber in a first direction and said second mirror scanning the light in an orthogonal direction; and an off-axis binary focusing lens for receiving the light scanned by said mirrors and focusing it at scanned points on an image plane and for receiving light reflected from said plane and directing it back to the optical fiber.

* * * * *